United States Patent
Williams et al.

(10) Patent No.: US 6,772,236 B1
(45) Date of Patent: Aug. 3, 2004

(54) SYSTEM FOR CONVEYING AN ATTRIBUTE OF A DEVICE NOT EXPLICITLY RECOGNIZED BY A PS/2 COMMUNICATION PROTOCOL AND WITHOUT REQUIRING MODIFICATION OF THE PROTOCOL

(75) Inventors: Brian D. Williams, Redmond, WA (US); Theron S. Welch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/420,039

(22) Filed: Apr. 17, 2003

(51) Int. Cl.$^7$ .............................................. G06F 13/10
(52) U.S. Cl. .............................. 710/19; 710/5; 710/15; 710/62; 710/67; 719/318
(58) Field of Search ................................ 710/8, 11, 15, 710/19, 5, 62–65, 67, 105, 106; 719/318, 321

(56) References Cited

U.S. PATENT DOCUMENTS

| | | | | |
|---|---|---|---|---|
| 5,122,970 A | * | 6/1992 | Gilbert et al. ................. | 702/33 |
| 5,473,344 A | | 12/1995 | Bacon et al. ................. | 345/163 |
| 5,872,995 A | * | 2/1999 | Chaiken ......................... | 710/5 |
| 5,912,661 A | | 6/1999 | Siddiqui ..................... | 345/166 |
| 6,178,527 B1 | * | 1/2001 | Vidales ......................... | 714/44 |
| 6,429,793 B1 | | 8/2002 | Paolini ......................... | 341/22 |

OTHER PUBLICATIONS

Chapweske, Adam. "The PS/2 Mouse Interface." 2001. Available http://panda.cs.ndsu.nodak.edu/~achapwes/PICmicro/mouse/mouse.html.

Microsoft Corporation, Windows Platform Design Notes, "Keyboard Scan Code Specification," Revision 1.3a. Mar. 16, 2000:34pp. Available http://www.microsoft.com/hwdev/desinit/ScanCode.htm#USB.

Milios, John. "The Smart Battery System Manager (SBSM): Improving System Performance and Enhancing Safety." 1999:17pp. Email John.Milios@usar.com.

Milios, John and Wei Wang. "System Management Bus—It's Not Just For Batteries." Nd:5pp. Email John.Milios@usar.com.

Milios, John and Bruce DeVisser. "Design Alternatives for the Basic User Input Device Interface in Portable Systems." Nd:6pp. Email John.Milios@usar.com.

"Keyboard Controller Firmware for Hitachi IKAP Family." Nd:4pp. Available http://www.insydesw.com/solutions/ia/ikap.htm.

* cited by examiner

Primary Examiner—Ilwoo Park
(74) Attorney, Agent, or Firm—Ronald M. Anderson (57) ABSTRACT

Reporting an attribute of a device via PS/2 protocols to a host executing an industry standard PS/2 port driver that does not include means to recognize the attribute. For example, a wireless mouse reports a battery state and a signal quality state through a standard PS/2 port driver that does not recognize any command or identifier for battery state or signal quality state. The attribute state is encoded in a standard PS/2 data packet. The standard PS/2 data packet is uniquely identified as an attribute packet by encoding data corresponding to highly unlikely mouse movement. A filter driver running on the host activates transmission of the attribute packets by commanding the port driver to issue a unique sequence of standard PS/2 commands, which the mouse system recognizes. The filter driver intercepts incoming PS/2 data packets, recognizes the unlikely data values that identify an attribute packet, and decodes the attribute state.

25 Claims, 7 Drawing Sheets

SYSTEM FOR CONVEYING AN ATTRIBUTE OF A DEVICE NOT EXPLICITLY RECOGNIZED BY A PS/2 COMMUNICATION PROTOCOL AND WITHOUT REQUIRING MODIFICATION OF THE PROTOCOL

FIELD OF THE INVENTION

The present invention generally relates to reporting an attribute value of a device over a PS/2 communication channel, and more specifically, pertains to reporting the attribute value of the device using PS/2 communication protocols and an industry standard PS/2 port driver that do not include provisions for explicitly recognizing the attribute or its value.

BACKGROUND OF THE INVENTION

The PS/2 communication protocol remains in wide use, especially for interfacing a keyboard and pointing device to a host computing device. Although the PS/2 communication protocol has many limitations, components conforming to the PS/2 protocol are relatively inexpensive and widely available. The requirements for PS/2 data packets that conform to this protocol for such devices are relatively simple and well known. Thus, the PS/2 protocol remains attractive for use in communicating with low cost devices, such as personal computer keyboards and pointing devices, that are connected to the PS/2 port of a computing device.

However, use of the standard PS/2 protocol has been extended somewhat to accommodate a few additional device features that were not originally contemplated in the protocol. For example, a scroll wheel on a mouse is accommodated by using the following 4-byte data packet rather than a conventional 3-byte data packet used for a mouse that does not include a scroll wheel. Clearly, specific drivers must be used with a mouse that includes a scroll wheel to support this added functionality.

certain to emerge. Thus, while it is desirable to continue using current PS/2 drivers and components, an approach is required to accommodate new features within the constraints of the PS/2 protocol.

For example, many newer PS/2 keyboards, mice, and other devices use wireless technology that frees the devices from direct connection with a host device. Although wireless devices provide greater freedom of movement, the wireless feature introduces other problems. For instance, wireless devices do not obtain power from the host device. Instead, the wireless devices typically include batteries to provide their own power. Similarly, wireless devices are more susceptible to electromagnetic interference than a wired device that is connected directly to the host device. Such problems create a need to monitor the wireless devices to determine parameters such as battery level and signal quality. Unfortunately, the PS/2 protocol and currently widely used industry standard port drivers do not support reporting such monitoring functions to the host. Although the port drivers could be rewritten to support monitoring functions or other features, rewriting the port drivers is undesirable, because of the required effort and expense, and because of the uncertain future of PS/2 ports on newer computing devices. Thus, an alternative approach is desired that enables use of the existing PS/2 infrastructure of drivers and components, yet accommodates monitoring and conveying information in regard to additional features of new devices that communicate using the PS/2 protocol.

SUMMARY OF THE INVENTION

The present invention provides a method and system for reporting a value of a device attribute to a host, wherein the device attribute is not explicitly recognized by the PS/2 communication protocol. The method and system also do not require modification of the PS/2 communication protocol or of an industry standard PS/2 port driver through which the device attribute is conveyed. Instead, the present invention involves encoding the device attribute value in a conventional PS/2 data packet, and identifying this encoded

|  | Bit 7 | Bit 6 | Bit 5 | Bit 4 | Bit 3 | Bit 2 | Bit 1 | Bit 0 |
|---|---|---|---|---|---|---|---|---|
| Byte 1 | Y overflow | X overflow | Y sign | X sign | Always 1 | Middle Btn | Right Btn | Left Btn |
| Byte 2 |  |  |  | X Movement Data |  |  |  |  |
| Byte 3 |  |  |  | Y Movement Data |  |  |  |  |
| Byte 4 |  |  |  | Z Movement Data |  |  |  |  |

The fourth byte comprises a 2's complement number that represents the scrolling wheel's movement since a last data report. A scroll wheel is sometimes referred to as a Z wheel, and scroll wheel movement is sometimes referred to as Z movement. Valid values of Z movement are in the range of −8 to +7 (decimal). Because the values are relatively low, the Z movement number is actually represented only by the least significant 4 bits of the $4^{th}$ byte. The most significant 4 bits act only as sign extension bits.

PS/2 port drivers were developed with considerable effort and expense to accommodate the above 4-byte data packet for scroll wheel movement. These PS/2 port drivers are now well known and widely available, constituting an industry standard. However, further extension of these port drivers to accommodate still more features is undesirable, because the PS/2 protocol is being replaced by more flexible alternative protocols, such as the universal serial bus (USB) protocol, designed for other types of communication ports on a computing device. Nevertheless, the PS/2 protocol is likely to remain in use for a number of years, and additional features for electronic devices that use the protocol are data packet with predefined device data that is highly unlikely to occur with regular use of the device. More specifically, a set of predefined device data comprises a predefined indicator and are provided in one portion of the encoded data packet that is allocated for conveying at least a first standard parameter that is explicitly recognized in the PS/2 protocol. The device attribute value is encoded in another portion of the encoded data packet that is allocated for at least a second standard parameter that is explicitly recognized in the PS/2 protocol. The encoded data packet is communicated to the host through a standard PS/2 port that is controlled by the industry standard PS/2 port driver. Preferably, the host executes a filter driver that evaluates each PS/2 packet received by the PS/2 port driver, and recognizes an encoded data packet by the predefined device data that comprises the predefined indicator. Once an encoded data packet is detected, the device attribute value is decoded from the encoded data packet. The host may then use the device attribute for any purpose.

The device may comprise any PS/2 compatible apparatus, such as a wireless mouse, keyboard, or other peripheral. The device attribute may comprise a power source state, a signal quality state, or other attribute of the device. Preferably, the host initiates the process or reporting a device attribute by sending a predetermined sequence of standard PS/2 commands to the device. The device recognizes this predetermined sequence as a single instruction to begin reporting the device attribute. Returned in the encoded data packet, the predefined indicator may be provided in one or more parameters that are allocated for movement data and/or other data of the device. Although the predefined indicator may comprise valid device data, the device data preferably corresponds to a combination of device movement data and device status data that has a very low probability of occurring. The device attribute value may be encoded in another parameter that is allocated for movement of a component on the device, such as in a Z movement parameter for a scroll wheel. After decoding the device attribute value from the encoded PS/2 data packet, the device attribute value may be compared to a previously stored valued. If different, a message may be displayed to a user, a separate application program may be launched, or other action taken.

Another aspect of the invention includes a machine readable medium storing machine instructions for carrying out the steps introduced above and described in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
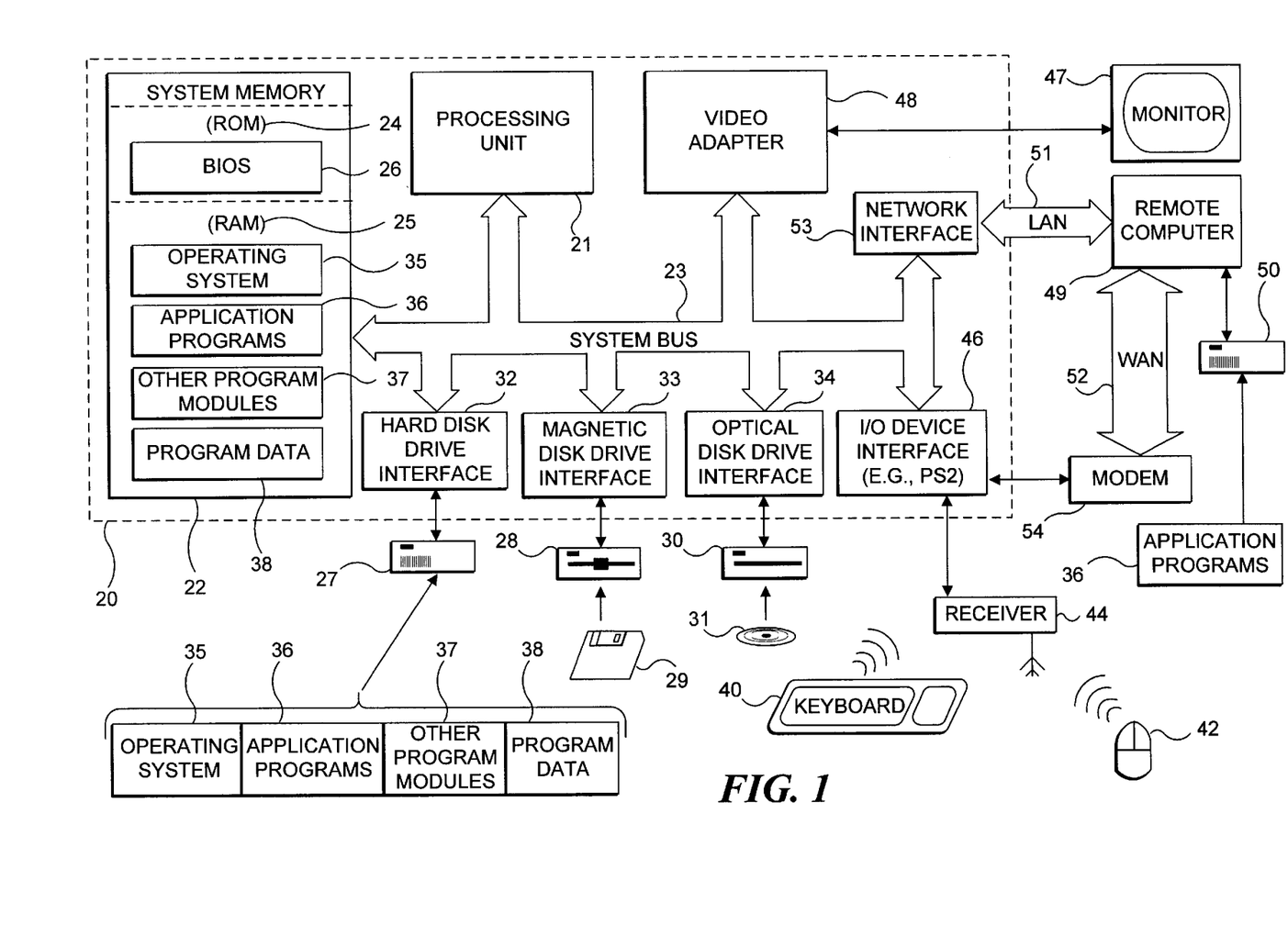
FIG. 1 is a functional block diagram of a general purpose computing device in the form of a conventional personal computer (PC) that is useful in implementing the present invention.

FIG. 1 and the following discussion are intended to provide a brief, general description of a suitable computing environment for use in implementing the present invention. Although not required, a portion of the present invention will be described in the general context of computer executable instructions, such as program modules that are executed by a PC or other processing device. Generally, program modules include routines, programs, objects, components, data structures, etc. that perform particular tasks or implement particular abstract data types. Those skilled in the art will appreciate that this invention may be practiced within other computing system configurations that uses the PS/2 communication protocol or other protocol that does not include provisions for reporting numerical status. Such configurations may include multiprocessor systems, network PCs, pocket personal computing devices, game consoles, TV set-top boxes, hand held devices, peripheral devices, digital cell phones, industrial control equipment, automotive equipment, aerospace equipment, and other microprocessor-based or consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention comprises a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within PC 20, such as during start up, is stored in ROM 24.

PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35, one or more application programs 36, other program modules 37, and program data 38.

A user may enter commands and information into PC 20 through input devices such as a keyboard 40 and a pointing device 42. Preferably, keyboard 40 and pointing device 42 comprise wireless devices that communicate with PC 20 through a receiver 44. Other input devices (not shown) may include a microphone, joystick, game pad, satellite dish, scanner, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term I/O device interface is intended to encompass each interface specifically used for a serial port, a parallel port, a game port, a keyboard port, a universal serial bus (USB) port and/or other communication port. However, the following preferred embodiment describes an I/O device interface specifically intended to be used with a PS/2 port. Also connected to system bus 23 via an appropriate interface, is a monitor 47 or other type of display device such as a video adapter 48, and is usable to display graphical user interfaces, images, Web pages, and/or other information. In addition to the monitor, PCs are often coupled to other peripheral output devices (not shown), such as speakers (through a sound card or other audio interface—not shown).

PC 20 may operate in a networked environment using logical connections to one or more remote sources, such as a remote computer 49. Remote computer 49 may be another PC, a server (which is typically generally configured much like PC 20), a router, a network PC, a peer device, a satellite, or other common network node, and typically includes many or all of the elements described above in connection with PC 20, although only an external memory storage device 50 has been illustrated in FIG. 1. In a networked environment, program modules depicted relative to PC 20, or portions thereof, may be stored in the remote external memory storage device. The logical connections depicted in FIG. 1 include a local area network (LAN) 51 and a wide area network (WAN) 52, such as the Internet. Such networking environments are common in offices, enterprise-wide computer networks, intranets, and the Internet.

When used in a LAN environment, PC 20 is connected to LAN 51 through a network interface or adapter 53 and typically includes a modem 54 or employs other means for communicating over WAN 52. Modem 54, which may be internal or external, is typically coupled directly to the system bus via an internal slot, or is coupled to the bus via I/O device interface 46, or is coupled to the bus via network interface 53. For example, modem 54 may be a broadband modem, such as an asymmetric digital subscriber line (ADSL) modem, that is coupled to the system bus via a USB interface. It will be appreciated that the network connections shown are exemplary and other means of establishing a communications link between the computers may be used, such as wireless communication and wide band network links.

Detailed Architecture

Figure 2:
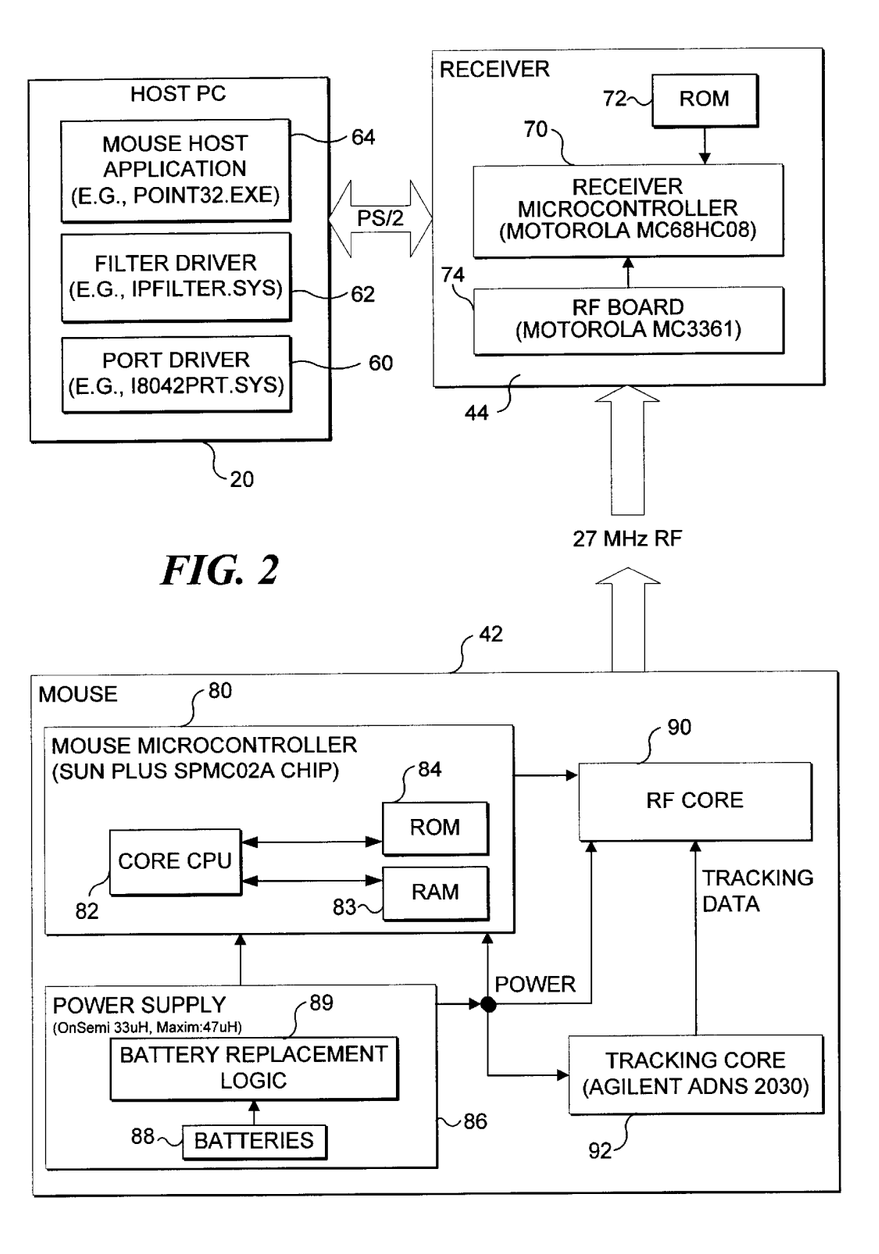
FIG. 2 is a block diagram illustrating functional components of a wireless mouse system that can detect and communicate a number of attributes via industry standard PS/2 protocols and an industry standard port driver.

The embodiment described below illustrates reporting of power and signal quality status over a PS/2 communication channel, however, other attributes may be reported. FIG. 2 is a block diagram illustrating functional components of a wireless mouse system that can detect and communicate a number of attributes via industry standard PS/2 protocols and an industry standard port driver. More specifically, this exemplary preferred embodiment enables wireless mouse 42 to communicate through receiver 44 to host PC 20, which is executing an industry standard PS/2 port driver 60 such as Microsoft Corporation's I8042PRT.SYS. In secure communication with port driver 60 is a filter driver 62, which evaluates PS/2 data packets to detect and decode attributes of mouse 42 such as a battery power state and wireless signal quality. Filter driver 62 is also in secure communication with a mouse host application program 64 that further processes the attribute data as described below.

Host PC 20 communicates through port driver 60 via PS/2 communication protocols to receiver 44. Receiver 44 receives wireless signals from mouse 42 and communicates corresponding PS/2 data packets to host PC 20. Receiver 44 includes a receiver microcontroller 70 such as a Motorola, Inc., type MC68HC08™. Receiver microcontroller 70 is in communication with a ROM 72 that stores firmware executed by receiver microcontroller 70 to process data received from mouse 42 and to communicate with host PC 20. Receiver microcontroller 70 receives data from mouse 42 via a radio frequency (RF) board 74, such as a Motorola, Inc., type MC3361™. RF board 72 preferably processes 27 MHz signals received from mouse 42. The data received from mouse 42 are generally not formatted as a PS/2 packet. Instead, receiver 44 converts the data received from mouse 42 into PS/2 packets before transmitting the PS/2 data packets to host PC 20. Receiver 44 preferably also recognizes battery state data and signal quality data from mouse 42, and communicates the battery state and signal quality data to host PC 20 only after host PC 20 commands receiver 44 to activate one or more reporting modes for these data.

Receiver 44 or host PC 20 may determine the quality of the signal received from mouse 42. However, mouse 42 must determine its own battery power level before communicating the battery power level to receiver 44. For this and other reasons, mouse 42 includes a mouse microcontroller 80, such as a Sun Plus Technology Company, Ltd. type SPMC02A™chip. Mouse microcontroller 80 includes a core CPU 82 in communication with a RAM 83 that stores instructions and data such as a current battery state. Core CPU 82 is also in communication with a ROM 84 that stores firmware executed by core CPU 82 to sample the battery power level approximately every minute, and to process other functions of mouse 42. Mouse microcontroller 80 is in communication with a power supply 86, which supplies power to all components of mouse 42. Preferably, power supply 86 comprises batteries 88, which are monitored in accord with battery replacement logic 89. Battery replacement logic 89 includes power detection circuitry and logic circuitry that detects a power level of batteries 88 and performs a reset function when batteries 88 are replaced. Specifically, when batteries 88 are replaced, battery replacement logic 89 reports a "GOOD" power state to mouse microcontroller 80, which resets power state logic used by mouse microcontroller 80. Mouse microcontroller 80 communicates power states, such as GOOD, LOW, and CRITICAL through RF core 90. RF core 90 is also used to communicate mouse movement, scroll wheel movement, button selection, and other data provided by tracking core 92 and mouse microcontroller 80. For clarity, some conventional mouse components are not shown, such as a scroll wheel, a light emitter, a photo detector, buttons, etc.

Exemplary Preferred Processing

The following describes detail regarding the processing logic used by various functional components of the wireless mouse system described above, including a process implemented in a Microsoft Corporation Windows XP™ operating system environment. Those skilled in the art will recognize that the present invention may be implemented in other operating system environments that may require slight modifications to the exemplary process described below.

Figure 3:
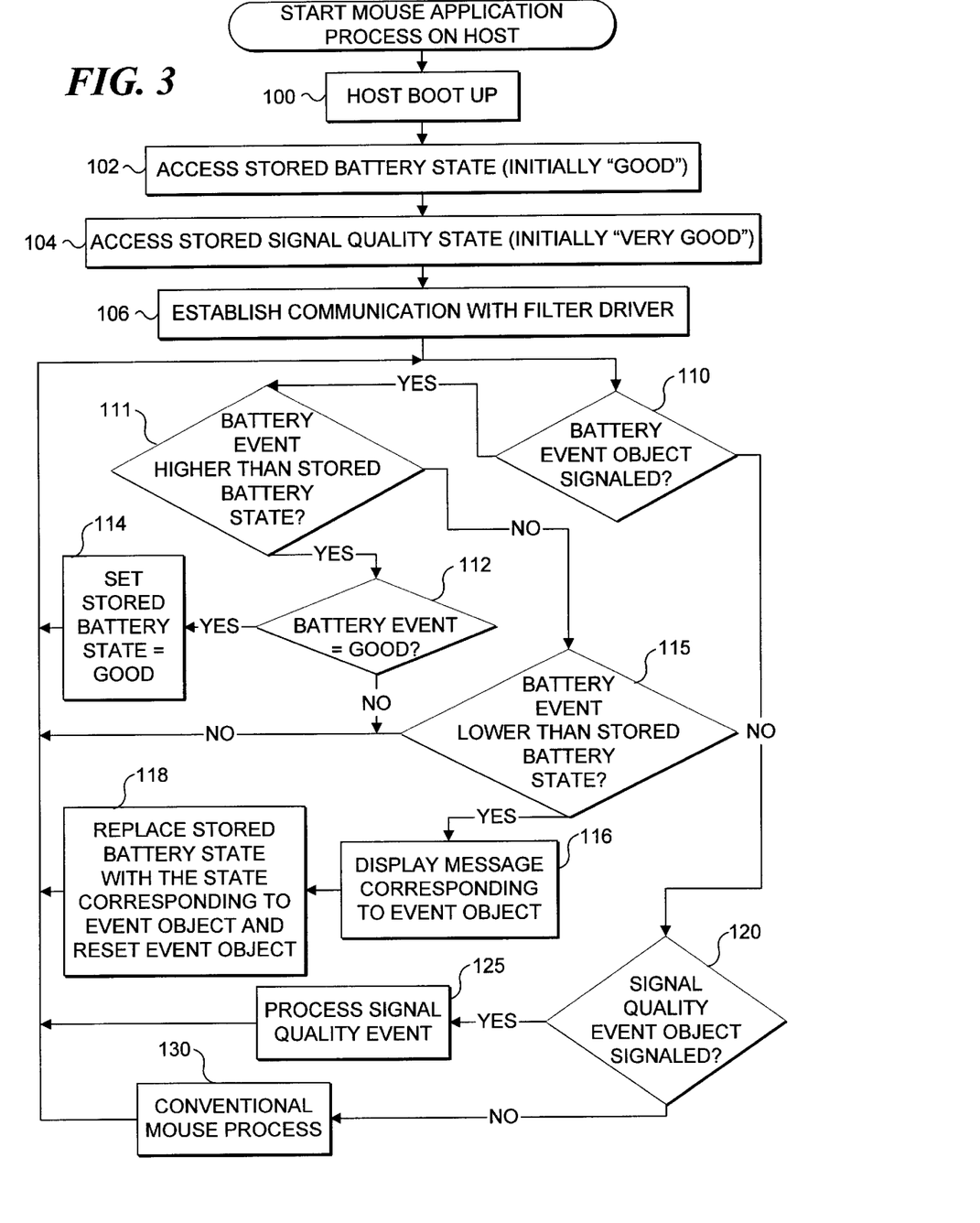
FIG. 3 is a flow diagram illustrating logic of the mouse host application process executed by the PC.

FIG. 3 is a flow diagram illustrating the logic of the mouse host application process executed by the host PC. At a step 100, the host PC performs its boot up (or restart) process. Upon boot up, the mouse host application accesses a previously stored battery state from a registry, at a step 102. When the mouse host application is initially installed on the host PC, the battery state is set to "GOOD," so that there is an initial battery state stored. Similarly, at a step 104, the mouse host application accesses a stored signal quality state, which is initially set to "VERY GOOD." The mouse host application then establishes communication with the filter driver, at a step 106. Preferably, communication is established by sending event objects to the filter driver for various battery states and signal quality states. For example, event objects 0 through 3 may correspond to battery states UNKNOWN, GOOD, LOW, and CRITICAL, respectively. These event objects enable secure communication between the mouse host application and the filter driver.

At a decision step 110, the mouse host application determines whether the filter driver has signaled a battery event object. If the filter driver has signaled a battery event object, the mouse host application determines, at a decision step 111, whether the battery event corresponds to a higher battery state. If the signaled battery state is higher than the stored battery state, an upward transition has occurred. For example, the battery state may have changed from LOW to GOOD. The mouse host application then determines, at a decision step 112, whether the battery event corresponds to a GOOD battery state. If the battery event corresponds to a GOOD battery state, the mouse host application sets the stored battery state to GOOD, at a step 114. Although the mouse host application will detect every signaled battery event, whether or not a transition occurs, a change to a GOOD battery state is the only transition that causes the mouse host application to reset the stored battery state (i.e., to GOOD). It is possible to have the mouse host application detect and store an upward transition to an intermediate battery state, such as from CRITICAL to LOW. However, this may cause excessive downward transitions later, and result in excessive battery messages displayed to a user. To avoid this result, only upward transitions to a GOOD battery state cause a reset of the stored battery state to GOOD. A transition to a GOOD battery state will generally occur when the batteries have been replaced in the mouse. If the stored battery state is reset to GOOD, control then returns to decision step 110 to await signaling of another event object. Control also returns to decision step 110 without resetting the stored battery state, if an upward transition does not rise to the level of a GOOD battery state.

If the signaled battery event is not higher than the stored battery state, the mouse host application determines, at a decision step 115, whether the battery event corresponds to a battery state that is lower than the stored battery state. In most cases, the battery event will not be higher and will not be lower than the stored battery state. In that steady-state case, control will simply return to decision step 110 to await another battery event. However, at some point, the battery event may correspond to a battery state that is lower than the stored battery state. For example, if the power level of the batteries in the mouse falls below a predefined threshold, a transition from a GOOD battery state to a LOW battery state will be detected by the mouse. The mouse may immediately communicate the LOW battery state to the receiver, rather than wait for a next regular report at approximately one minute intervals. The receiver will in turn communicate the LOW battery state to the host PS/2 port driver. The filter driver will detect a PS/2 data packet with the LOW battery state encoded. The filter driver will then signal the battery event object corresponding to the LOW battery state. At decision step 115, the mouse host application will compare the LOW battery state with the stored battery state. Because the LOW battery state is lower than the stored GOOD battery state, the mouse host application running on the PC or computing device will display a warning message at a step 116. The particular warning message selected for display corresponds to the detected event object, such as LOW, and instructs the user to replace the batteries in the mouse. A message need not be displayed for a transition from a lower battery state to a higher battery state. Similarly, a message is not needed for a battery event that corresponds to a battery state that is already stored. Thus, if a battery event is not lower than the stored battery state, control returns to decision step 110 to await signaling of a battery event object. However, if a transition has occurred to a lower battery state, and a message has been displayed, the mouse host application replaces the stored battery state with the state corresponding to the most recent event object, at a step 118. The mouse host application also resets the event object, and control again returns to decision step 110 to await signaling of another event object.

If the mouse host application determines that a battery event object was not signaled, the mouse host application determines, at a decision step 120, whether a signal quality event object was signaled. If the mouse host application determines that a signal quality event object was signaled, the mouse host application processes the signal quality event at a step 125. The processing of a signal quality event is generally analogous to processing a battery event, as described above. However, the mouse host application may perform other steps such as first averaging a number of signal quality events to determine a current signal quality state. The mouse host application may also launch a wizard or other function to enable further signal quality testing and/or display actions that a user may take to improve signal quality. Once a signal quality event is processed, control again returns to decision step 110 to await signaling of another event object.

If a signal quality event object was not signaled, the mouse host application performs conventional mouse processing, at a step 130. Conventional mouse processing may include moving a display cursor in relation to movement of the mouse, activating a function in relation to pressing a mouse button, and other conventional mouse operations. Control again returns to decision step 110 to await signaling of another event object or further processing data received from the mouse.

Figure 4:
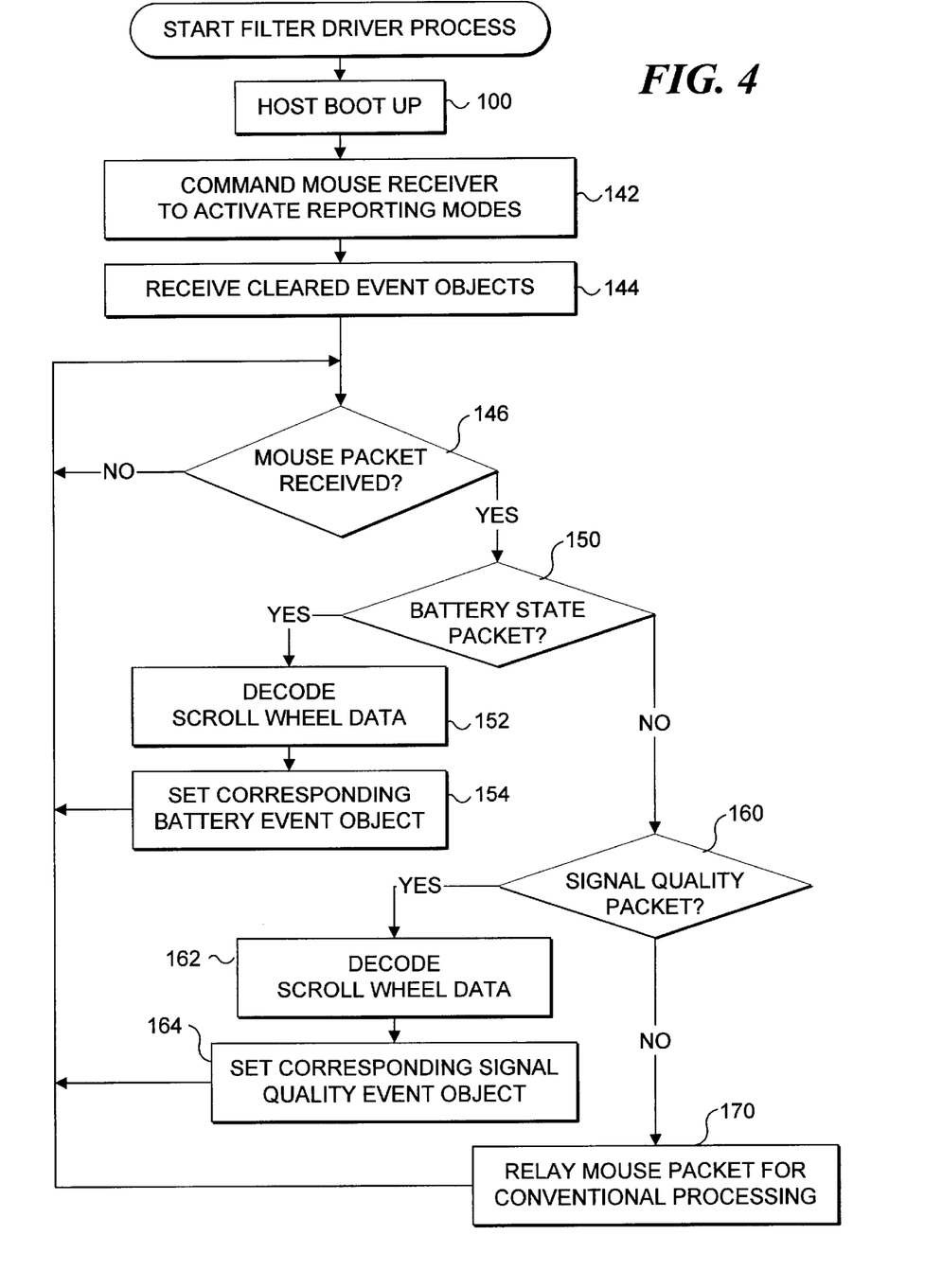
FIG. 4 is a flow diagram illustrating logic performed by a filter driver.

FIG. 4 is a flow diagram illustrating the logic performed by the filter driver. Upon boot up (or restart) of the host PC, at step 100, the filter driver and other operating system modules begin loading. The filter driver generally loads before the complete operating system loads. While the operating system continues loading, the filter driver commands the mouse receiver to activate reporting modes for battery state and signal quality state, at a step 142,. Activating the reporting modes is sometimes referred to as "knocking" the receiver and is preferably accomplished by sending a predefined sequence of standard PS/2 instructions to the receiver. Because the PS/2 protocol and the industry standard port driver do not support an existing command to activate reporting modes, the filter driver can only command the standard port driver to send the predefined sequence of standard PS/2 instructions. However, the receiver will recognize the predefined sequence of standard PS/2 instructions as a command to activate reporting modes. For example, to activate battery state reporting, the filter driver commands the port driver to issue the following predefined sequence of commands to the receiver:

Set mouse sampling rate =200

Set mouse sampling rate =200

Set mouse sampling rate =60

When the receiver detects this predefined sequence of sampling rate commands, the receiver will activate reporting of the battery state. A different predefined sequence of standard PS/2 instructions will activate the signal quality reporting. Once these functions are activated, the receiver can then begin returning the battery state and signal quality state encoded within industry standard PS/2 data packets.

After the filter driver "knocks" the receiver, and the operating system and the mouse host application are loaded, the filter driver receives the event objects from the mouse host application, at a step 144. The filter driver also begins monitoring (i.e., filtering) PS/2 data packets received by the port driver. Specifically, at a decision step 146, the filter driver detects when a PS/2 mouse data packet is received.

When a mouse packet is received, the filter driver determines, at a decision step 150, whether the mouse packet is a battery state packet. A battery state packet is identified by predefined encoded values in a standard PS/2 data packet. Preferably, the predefined encoded values represent data that are highly unlikely to occur during normal use of the mouse. For example, X and Y directional values of the received PS/2 data packet may correspond to a mouse movement that is virtually impossible for a user to intentionally perform. In addition, a scroll bit may be set, which would indicate another action that is virtually impossible for a user to intentionally perform; namely that the user was moving the scroll wheel while performing the virtually impossible mouse movement. If the scroll bit is set and these highly unlikely pair of X and Y directional values are received in a PS/2 data packet, the filter driver can safely infer that the PS/2 data packet is a battery state packet.

If the filter driver determines that a battery state data packet was received, the filter driver decodes a predefined portion of the battery state packet, at a step 152. For instance, the filter driver may decode the portion of the battery state packet that stores scroll wheel data. The following combinations of scroll wheel data can identify the battery state of the mouse.

00=UNKNOWN
01=GOOD
10=LOW
11=CRITICAL

Having decoded the scroll wheel data, the filter driver signals the corresponding battery event object, at a step 154. Control then returns to decision step 146 to await another mouse packet.

If the received mouse packet is not a battery state packet, the filter driver determines, at a decision step 160, whether the received mouse packet comprises a signal quality packet. A signal quality packet is identified by a different set of predefined packet data. For example, a different set of X and Y mouse movement data may indicate that the mouse packet is a signal quality packet. If the filter driver detects a signal quality packet, the filter driver decodes the signal quality packet to obtain an encoded signal quality state, at a step 162. For instance, the filter driver may again decode scroll wheel data to find one of the following signal quality states.

00=Less than M% bad packets

01=Between M% and N % bad packets

10=Between N% and O% bad packets

11=More than O% bad packets

As indicated above, the mouse microcontroller, the receiver microcontroller, the filter driver, or the mouse host application may average a number of signal quality reports to determine a simpler signal quality state, such as HIGH or LOW. Once the signal quality state is decoded, the filter driver signals a corresponding signal quality event object, at a step 164. Control then returns to decision step 146 to await another mouse packet.

If a received mouse packet is not a battery state packet and is not a signal quality packet, the filter driver ignores the received mouse data packet or relays the received mouse data packet for conventional mouse packet processing, at a step 170. Those skilled in the art will recognize that other attributes may be detected, decoded, and processed in a similar fashion to that described above.

Figure 5:
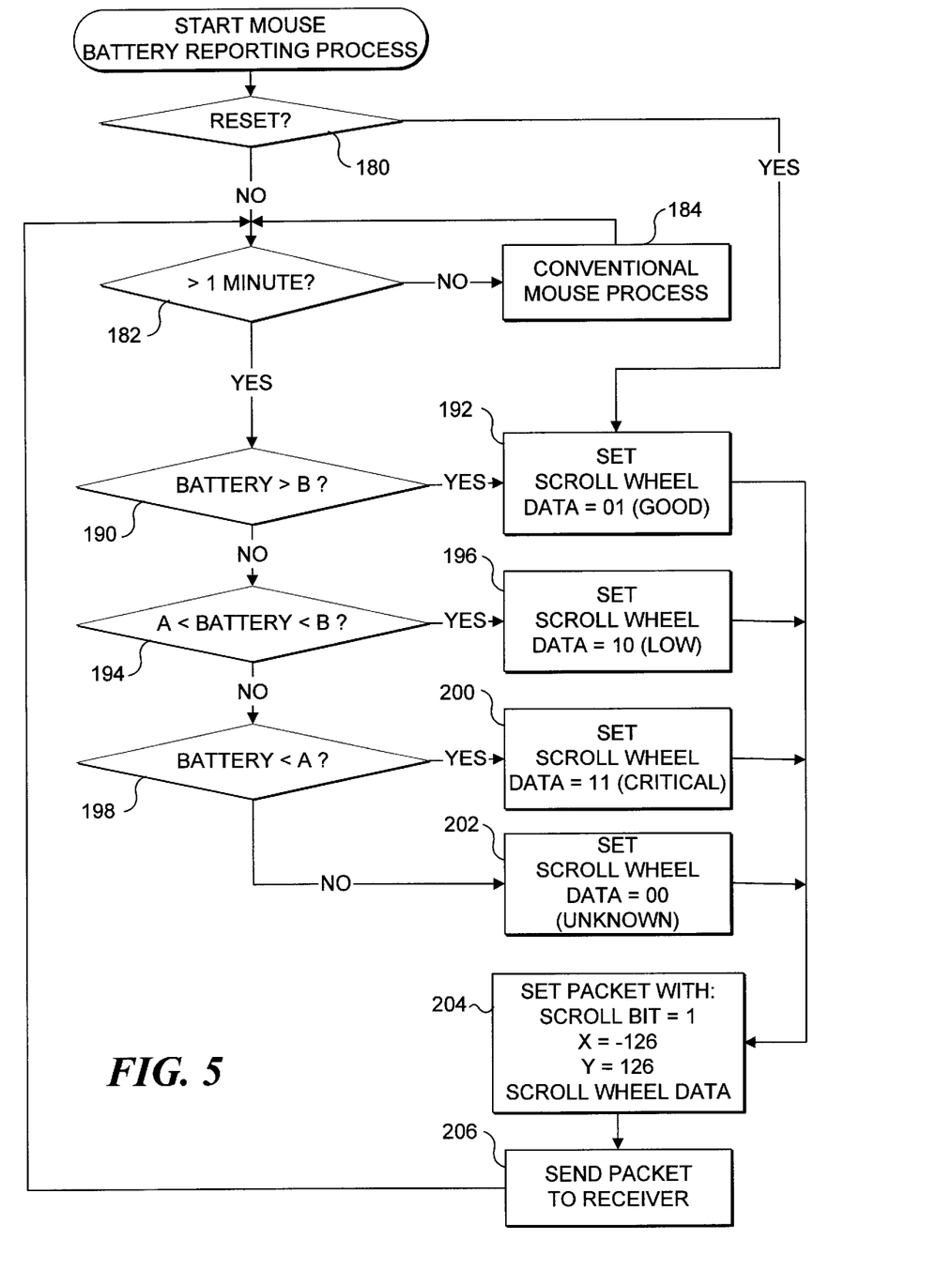
FIG. 5 is a flow diagram illustrating logic of a mouse battery reporting process.

FIG. 5 is a flow diagram illustrating logic of the mouse battery reporting process. At a decision step 180, the mouse determines whether a reset occurred. For example, if old batteries are removed and replaced with new batteries in the wireless mouse, a power up reset of the mouse will occur. If a power up reset has occurred, the mouse immediately sets scroll wheel data to 01, at a step 192, indicating a GOOD battery state. This scroll wheel data is transmitted to the receiver as discussed in further detail below. As discussed above, when the mouse resets, the mouse reports a GOOD battery state to reset the stored battery state to GOOD if necessary. Thereafter, the battery state will be regularly monitored and reported to the host.

After a reset, or if no reset is detected, the mouse determnines, at a decision step 182, whether a one minute period of time has elapsed since a previous report of the mouse battery state. Those skilled in the art will recognize that more complex timing paradigm may be implemented. For example, a report timer may wait a predefined period of time after the mouse is awakened from a power save state before reporting a battery level. Also, detected transitions between battery states may be reported immediately, rather than waiting until the next regular interval. If the predefined period specified in decision step 182 has not lapsed, the mouse performs conventional mouse processing, at a step 184. Specifically, the mouse detects and communicates mouse movements, scroll wheel movements, button activations, etc.

While the conventional mouse processing occurs, the mouse also samples the battery level. Once the predefined period has elapsed, the mouse determines, at a decision step 190, whether the current battery level is greater than a predefined upper threshold. If the battery level is greater than a predefined upper threshold, the mouse sets the scroll wheel data to reflect a GOOD battery state, at step 192, and this data is sent to the receiver, as discussed below. Note that the mouse may also be programmed to perform a comparison with a locally stored battery state, as is done by the mouse host application on the host PC. Thus, the mouse could wait for a transition to a lower battery state before sending a report, or send a report immediately upon a transition without waiting the predefined period. However, the host PC may also use reports of a GOOD battery state for other purposes, such as tracking an amount of time a set of batteries stays at the GOOD battery state (as well as the amount of time that the batteries stay at other lower battery states). Tracking this information may be useful in determining, for example, whether a set of rechargeable batteries cannot hold a charge sufficiently long and should be replaced, rather than simply recharged.

In any case, if the current battery charge level is not above the predefined upper threshold, the mouse determines, at a decision step 194, whether the current battery charge level is between the upper threshold level and a critical threshold level. If the battery level falls within this intermediate range, the mouse sets the scroll wheel data to reflect a LOW battery state, at a step 196. Similarly, if the current battery level is not within the intermediate range, the mouse determines, at a decision step 198, whether the current level is below the critical threshold level. If the battery level is below the critical threshold level, the mouse sets the scroll wheel data to reflect a CRITICAL battery state at a step 200. If the mouse cannot identify the current battery charge level, the mouse sets the scroll wheel data to reflect an UNKNOWN battery state, at a step 202.

After the scroll wheel data are encoded with a battery state, the mouse creates a data packet with the encoded battery state and the predefined battery packet identifier at a step 204. As indicated above, the predefined battery packet identifier preferably reflects a highly unlikely combination of standard mouse data. For example, the mouse may set a scroll bit to one, indicating that the scroll wheel is being moved. In addition, the mouse may set X directional data to an unlikely negative value, and set Y directional data to an unlikely positive value. This unlikely combination of scroll bit and directional values indicate that the data packet is a battery state packet, rather than actual data indicating the movement of the mouse. Other conventional data in the data packet will be zeroed or ignored.

At a step 206, the mouse then sends the data packet to the receiver. The receiver incorporates the encoded battery state and battery state indicator into a standard PS/2 packet. As discussed above, the standard PS/2 packet is communicated to the standard PS/2 port driver of the host PC, and detected by the filter driver. Once the mouse packet is sent, control returns to decision step 182 to await the predefined period before reporting another battery state. Those skilled in the art will recognize that the process described above may also be used with slight modifications to report other attributes of the mouse. Similarly, those skilled in the art will recognize that the receiver may perform a similar process to report the signal quality state.

Exemplary Messages

Figure 6A:
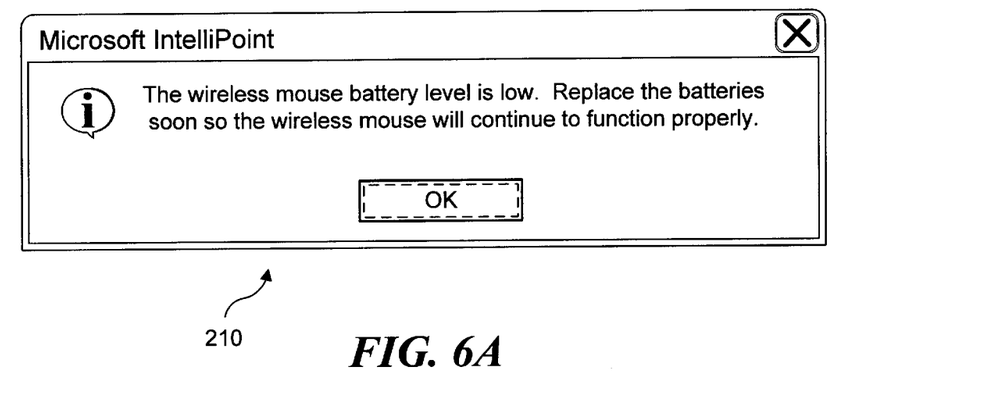
FIG. 6A illustrates a dialog box that is displayed if a transition is detected from a GOOD battery state to a LOW battery state.
Figure 6B:
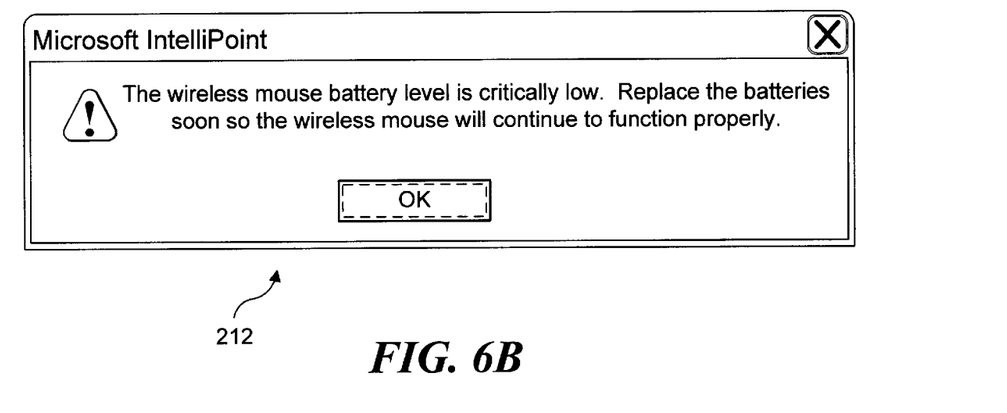
FIG. 6B illustrates another dialog box that is displayed when a transition is detected from a GOOD or LOW battery state to a CRITICAL battery state.

Once a battery state, signal quality state, or other attribute is reported, the mouse host application on the host PC determines whether a reported state, or state transition, warrants displaying a warning or other message to a user. FIG. 6A illustrates a dialog box 210 that would be displayed if a transition is detected from a GOOD battery state to a LOW battery state. As shown, dialog box 210 suggests that the user-replace the mouse batteries so that the wireless mouse will continue to function properly. Similarly, FIG. 6B illustrates another dialog box 212 that is displayed when a transition is detected from a GOOD or LOW battery state to a CRITICAL battery state. Dialog box 212 also encourages the user to replace the mouse battery soon, so that the wireless mouse will continue to function properly.

Figure 7:
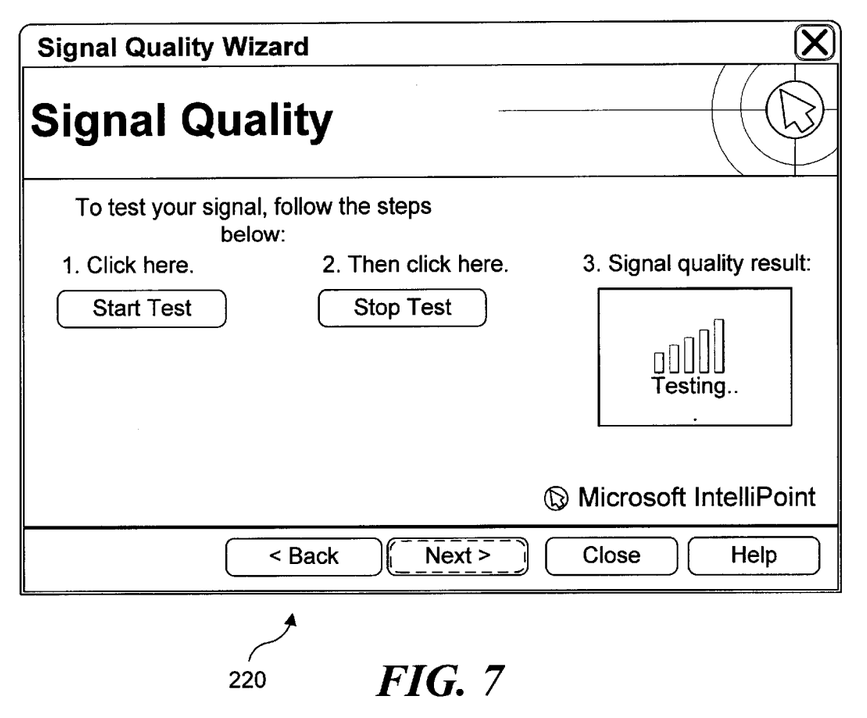
FIG. 7 illustrates a signal quality wizard dialog box that is launched upon detection of a poor signal from a wireless mouse.

The mouse host application may also, or alternatively, launch another application as a result of detecting an encoded state or a transition. FIG. 7 illustrates a signal quality wizard dialog box 220 that may be launched upon detection of a poor signal from the wireless mouse. Signal quality wizard dialog 220 enables a user to control testing of signal quality. If a poor signal continues to be detected, the signal quality wizard may display additional dialog boxes recommending actions that the user may take. It will be apparent that automatic corrections or other actions may be performed, based on detected attributes conveyed as described above.

Although the present invention has been described in connection with the preferred form of practicing it and modifications thereto, those of ordinary skill in the art will understand that many other modifications can be made to the present invention within the scope of the claims that follow. For example, a 3-byte PS/2 data packet could be used to carry an encoded attribute value in the first byte and the predefined identifier in the bytes comprising the X and Y movement data. Accordingly, it is not intended that the scope of the invention in any way be limited by the above description, but instead be determined entirely by reference to the claims that follow.

The invention in which an exclusive right is claimed is defined by the following:

1. A method of reporting a value of an attribute of a device to a host, wherein the attribute of the device is not explicitly recognized by a PS/2 communication protocol and without requiring modification of the PS/2 communication protocol by which the attribute of the device is conveyed, comprising the steps of:
(a) providing a predefined indicator for one portion of a PS/2 data packet with the device, said portion being allocated for conveying a first parameter that is explicitly recognized in the PS/2 communication protocol;
(b) encoding the value of the attribute that is not explicitly recognized into another portion of the PS/2 data packet, said other portion being allocated for a second parameter that is explicitly recognized in the PS/2 communication protocol, said one portion and said other portion comprising an encoded PS/2 data packet;
(c) communicating the encoded PS/2 data packet to a host using the PS/2 communication protocol;
(d) receiving the encoded PS/2 data packet with a PS/2 port driver that has not been modified to explicitly recognize the attribute being reported;
(e) detecting the predefined indicator in the one portion of the encoded PS/2 data packet, at the host; and
(f) decoding the attribute from the other portion of the encoded PS/2 packet to recover the value of the attribute of the device, so that the value of the attribute is available to the host.

2. The method of claim 1, wherein the attribute comprises one of a power source state and a signal quality state.

3. The method of claim 1, wherein the device comprises:
(a) a wireless peripheral that transmits wireless signals; and
(b) a receiver that receives the wireless signals from the wireless peripheral and communicates the encoded PS/2 data packet to the host.

4. The method of claim 1, wherein the one portion of the PS/2 data packet is allocated for indicating a movement of the device.

5. The method of claim 1, wherein the other portion of the PS/2 data packet is allocated for indicating a rotational movement of a component of the device.

6. The method of claim 1, wherein the PS/2 data packet comprises one of 3 bytes of data and 4 bytes of data.

7. The method of claim 1, wherein the predefined indicator comprises a value for the first parameter that is substantially unlikely to occur during use of the device.

8. The method of claim 1, further comprising the steps of:
(a) storing values of the attribute;
(b) accessing a previous value of the attribute of the device that was stored;
(c) determining whether the previous value of the attribute differs from a current value of the attribute from the encoded PS/2 data packet; and
(d) indicating if the previous value of the attribute differs from the current value.

9. The method of claim 1, wherein prior to the step of providing the predefined indicator, further comprising the step of:
(a) communicate a predetermined sequence of commands conforming to the PS/2 protocol from the host to the device; and
(b) detecting the predetermined sequence of commands to initiate reporting the attribute by the device.

10. An electronic device that conveys a value of an attribute of the electronic device for communication to a host, wherein the attribute of the electronic device is not explicitly recognized by a PS/2 communication protocol and without requiring modification of the PS/2 communication protocol by which the attribute of the electronic device is conveyed from the electronic device to the host, said electronic device comprising:
(a) a processor;
(b) a detector in communication with the processor, said detector detecting the attribute of the electronic device;
(c) a communication interface that is coupled in communication with the processor;
(d) a memory that is coupled in communication with the processor and which stores machine instructions, execution of said machine instructions by the processor causing the processor to perform a plurality of functions, including:

(i) accessing a value of the attribute detected by the detector;

(ii) providing a predefined indicator for transmission in one portion of an encoded PS/2 data packet, said one portion being allocated for conveying a first parameter that is explicitly recognized in the PS/2 communication protocol;

(iii) encoding the value of the attribute for transmission in another portion of the encoded PS/2 data packet, said other portion being allocated for a second parameter that is explicitly recognized in the PS/2 communication protocol; and (iv) communicating the predefined indicator and the value of the attribute as encoded through the communication interface, for conveyance to the host.

11. The electronic device of claim 10, wherein the attribute comprises one of a power source status and a signal quality status.

12. The electronic device of claim 10, wherein the electronic device comprises one of a wireless computer mouse and a wireless computer keyboard.

13. The electronic device of claim 10, wherein the predefined indicator comprises a value that is substantially unlikely to occur during use of the electronic device.

14. The electronic device of claim 10, wherein the electronic device further comprises a PS/2 port interface to which the predefined indicator and the value of the attribute that is encoded, are conveyed, wherein prior to communicating the predefined indicator and the attribute that is encoded, the PS/2 port interface responds to predefined sequence of commands conforming to the PS/2 standard instructions conveyed from the host by initializing reporting the value of the attribute to the host in encoded PS/2 data packets that include the predefined indicator that was provided.

15. A method of determining a value for an attribute of an electronic device, wherein the attribute of the electronic device is not explicitly recognized by a PS/2 communication protocol and without requiring modification of the PS/2 communication protocol by which the value of the attribute of the electronic device is conveyed, comprising the steps of:

(a) communicating a predefined sequence of PS/2 commands to the electronic device with a PS/2 port driver that has not been modified to explicitly recognize the attribute of the electronic device, said predefined sequence of PS/2 commands activating the electronic device to initialize reporting the value of the attribute;

(b) detecting a predefined indicator in one portion of an encoded PS/2 data packet received by the PS/2 port driver from the electronic device, said one portion being allocated for a first parameter that is explicitly recognized in the PS/2 communication protocol; and (c) decoding the value of the attribute from another portion of the encoded PS/2 data packet, said other portion being allocated for a second parameter that is explicitly recognized in the PS/2 communication protocol.

16. The method of claim 15, further comprising the steps of:

(a) determining whether a decoded value of the attribute differs from a previous value of the attribute; and (b) initiating an additional process if the decoded value of the attributed differs from a previous value of the attribute.

17. The method of claim 16, wherein the additional process comprises one of the steps of:

(a) reporting the decoded value of the attribute to a user; and (b) assisting a user in responding to the decoded value of the attribute.

18. The method of claim 15, wherein the attribute comprises one of power source status and a signal quality status.

19. The method of claim 15, further comprising the step of preventing the encoded PS/2 data packet from being used by a program module that uses other PS/2 data packets.

20. A machine readable medium storing machine instructions for carrying out the steps of claim 15.

21. A system for determining a value for an attribute of an electronic device, wherein the attribute of the electronic device is not explicitly recognized by a PS/2 communication protocol and without requiring modification of the PS/2 communication protocol by which the value of the attribute of the electronic device is conveyed, comprising:

(a) a processor;

(b) a PS/2 port in communication with the processor, said PS/2 port being controlled by a PS/2 port driver that conforms to the PS/2 communication protocol and has not been modified to explicitly recognize the attribute of the electronic device;

(c) a memory that is coupled in communication with the processor and which stores machine instructions, execution of said machine instructions by the processor causing the processor to perform a plurality of functions, including:

(i) communicating a predefined sequence of PS/2 commands to the electronic device with the PS/2 port driver, said predefined sequence of PS/2 commands activating the electronic device to initialize reporting the value of the attribute;

(ii) detecting a predefined indicator in one portion of an encoded PS/2 data packet received by the PS/2 port driver from the electronic device, said one portion being allocated for a first parameter that is explicitly recognized in the PS/2 communication protocol; and (iii) decoding the value of the attribute from another portion of the encoded PS/2 data packet, said other portion being allocated for a second parameter that is explicitly recognized in the PS/2 communication protocol.

22. The system of claim 21, wherein execution of the machine instructions further causes the processor to perform the functions of:

(a) determining whether a decoded value of the attribute differs from a previous value of the attribute; and (b) initiating an additional process if the decoded value of the attributed differs from a previous value of the attribute.

23. The system of claim 21, wherein execution of the machine instructions further causes the processor to perform the functions of:

(a) reporting the decoded value of the attribute to a user; and (b) assisting a user in responding to the decoded value of the attribute.

24. The system of claim 21, wherein the attribute comprises one of power source status and a signal quality status.

25. The system of claim 21, wherein execution of the machine instructions further causes the processor to perform the function of preventing the encoded PS/2 data packet from being used by a program module that uses other PS/2 data packets.

* * * * *